US011568741B2

(12) United States Patent
Lee et al.

(10) Patent No.: US 11,568,741 B2
(45) Date of Patent: Jan. 31, 2023

(54) COMMUNICATION DEVICE, CONTROL METHOD THEREOF, AND COMMUNICATION SYSTEM INCLUDING THE SAME

(71) Applicant: LG Electronics Inc., Seoul (KR)

(72) Inventors: Jinsang Lee, Seoul (KR); Sungmin Kim, Seoul (KR); Jihyun Kim, Seoul (KR); Seunghwan Bang, Seoul (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 17/018,373

(22) Filed: Sep. 11, 2020

(65) Prior Publication Data
US 2020/0410852 A1 Dec. 31, 2020

Related U.S. Application Data

(63) Continuation of application No. PCT/KR2018/016567, filed on Dec. 24, 2018.

(51) Int. Cl.
*G08G 1/01* (2006.01)
*G08G 1/0967* (2006.01)
*G08G 1/16* (2006.01)

(52) U.S. Cl.
CPC ..... *G08G 1/0145* (2013.01); *G08G 1/096725* (2013.01); *G08G 1/096775* (2013.01); *G08G 1/164* (2013.01)

(58) Field of Classification Search
CPC ........... G08G 1/0145; G08G 1/096725; G08G 1/164; G08G 1/096775
See application file for complete search history.

(56) References Cited

U.S. PATENT DOCUMENTS

| 9,020,660 | B2* | 4/2015 | Mudalige | G05D 13/00 |
| | | | | 701/2 |
| 9,349,288 | B2* | 5/2016 | Raamot | G08G 1/052 |
| 9,528,838 | B2* | 12/2016 | Okumura | B60W 30/18154 |
| 9,761,136 | B2* | 9/2017 | Tonguz | G08G 1/087 |
| 9,805,604 | B2* | 10/2017 | Mizuguchi | G08G 1/096758 |
| 10,198,943 | B2* | 2/2019 | Raamot | G08G 1/0112 |
| 10,319,235 | B2* | 6/2019 | Gupta | G08G 1/162 |
| 10,437,256 | B2* | 10/2019 | Andert | G08G 1/166 |
| 10,671,076 | B1* | 6/2020 | Kobilarov | G08G 1/166 |
| 10,691,127 | B2* | 6/2020 | Kobilarov | G05D 1/0274 |

(Continued)

FOREIGN PATENT DOCUMENTS

| JP | 2017117186 | | 6/2017 | | |
| KR | 20130007754 A | * | 1/2013 | ............. | G08G 1/164 |

(Continued)

*Primary Examiner* — Luis A Martinez Borrero
(74) *Attorney, Agent, or Firm* — Fish & Richardson P.C.

(57) ABSTRACT

A communication device includes a communication unit configured to receive first path information from a first vehicle and to receive second path information from a second vehicle, and a processor configured to determine a possibility of the first and second vehicles entering a predetermined area based on the first and second path information, and based on the possibility being greater than a reference, transmit a message for controlling at least one of the first vehicle or the second vehicle through the communication unit to allow the first and second vehicles to enter the predetermined area at different time points.

19 Claims, 7 Drawing Sheets

(56) References Cited

U.S. PATENT DOCUMENTS

| | | | |
|---|---|---|---|
| 10,755,557 B2* | 8/2020 | Tanabe | G08G 1/0112 |
| 10,852,736 B2* | 12/2020 | Tao | G08G 1/164 |
| 10,991,247 B2* | 4/2021 | Baldwin | G08G 1/166 |
| 11,269,330 B2* | 3/2022 | Khayatian | G05D 1/0088 |
| 2016/0027300 A1* | 1/2016 | Raamot | G08G 1/0145 |
| | | | 340/922 |
| 2016/0148505 A1* | 5/2016 | Mizuguchi | G08G 1/163 |
| | | | 701/41 |
| 2017/0110011 A1* | 4/2017 | Tonguz | G08G 1/087 |
| 2017/0221366 A1* | 8/2017 | An | G08G 1/096758 |
| 2017/0262709 A1* | 9/2017 | Wellington | G06V 20/582 |
| 2018/0012492 A1* | 1/2018 | Baldwin | G08G 1/096741 |
| 2018/0261098 A1* | 9/2018 | Gupta | G08G 1/162 |
| 2018/0275678 A1* | 9/2018 | Andert | G08G 1/164 |
| 2018/0329418 A1* | 11/2018 | Baalke | G06Q 50/28 |
| 2019/0066498 A1* | 2/2019 | Baldwin | G08G 1/096741 |
| 2019/0088115 A1* | 3/2019 | Tanabe | G08G 1/166 |
| 2019/0212744 A1* | 7/2019 | Milstein | G05D 1/0212 |
| 2019/0220011 A1* | 7/2019 | Della Penna | G06V 20/58 |
| 2019/0272747 A1* | 9/2019 | Raamot | G08G 1/0129 |
| 2020/0097003 A1* | 3/2020 | Wray | G05D 1/0088 |
| 2020/0166934 A1* | 5/2020 | Khayatian | G08G 1/0112 |
| 2020/0242922 A1* | 7/2020 | Dulberg | G08G 1/012 |
| 2020/0286386 A1* | 9/2020 | Zhou | G08G 1/0116 |
| 2021/0201678 A1* | 7/2021 | Baldwin | G08G 1/096725 |
| 2021/0327264 A1* | 10/2021 | Raamot | G08G 1/0145 |
| 2021/0373575 A1* | 12/2021 | Manjunath | G08G 1/163 |

FOREIGN PATENT DOCUMENTS

| | | | | |
|---|---|---|---|---|
| KR | 1020130007754 | | 1/2013 | |
| KR | 101362706 | | 2/2014 | |
| KR | 101399026 | | 5/2014 | |
| KR | 1020170099818 | | 9/2017 | |
| WO | WO-2016018636 A1 * | 2/2016 | | B60W 30/09 |

* cited by examiner

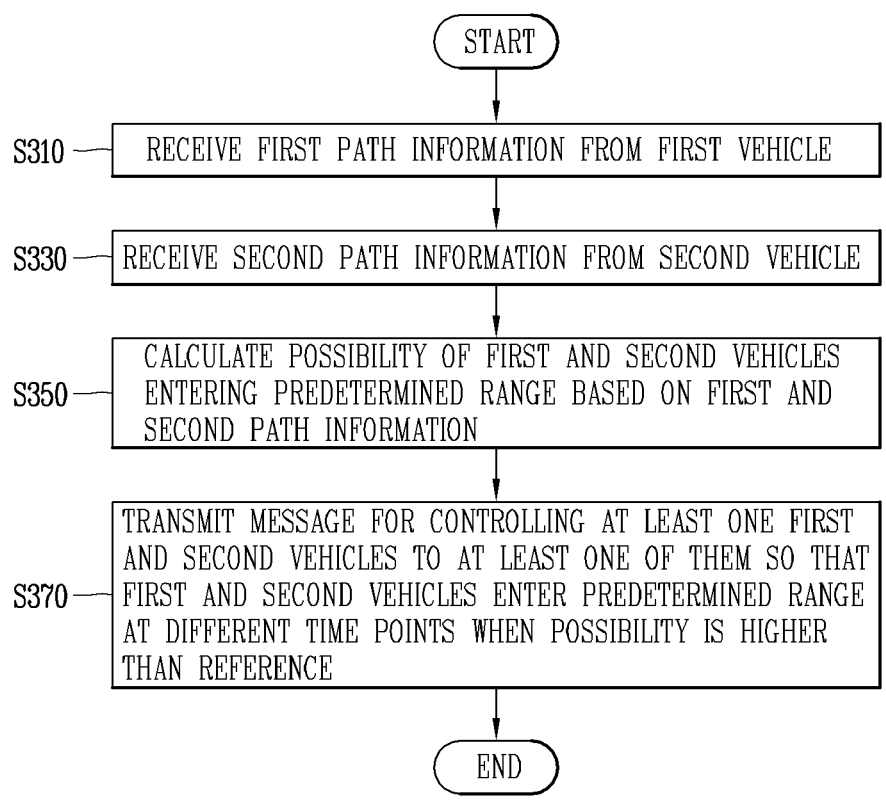

COMMUNICATION DEVICE, CONTROL METHOD THEREOF, AND COMMUNICATION SYSTEM INCLUDING THE SAME

CROSS-REFERENCE TO RELATED APPLICATION

This application is a continuation of International Application No. PCT/KR2018/016567, filed on Dec. 24, 2018, the contents of which is incorporated by reference in its entirety.

TECHNICAL FIELD

The present disclosure relates to a communication device capable of communicating with a vehicle or electric components provided in the vehicle, a control method thereof, and a communication system including the same.

BACKGROUND

A vehicle may transport people or goods by using kinetic energy. Examples of vehicles include automobiles and motorcycles.

In some examples, for safety and convenience of a user who uses the vehicle, the vehicle may include various sensors and devices, and functions of the vehicle may be diversified.

The functions of the vehicle may be divided into a convenience function for promoting driver's convenience, and a safety function for enhancing safety of the driver and/or pedestrians.

The convenience function may include providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function for ensuring safety of the driver and/or pedestrians may include various functions, such as a lane departure warning system (LDWS), a lane keeping assist system (LKAS), an autonomous emergency braking (AEB), and the like.

For convenience of a user using a vehicle, various types of sensors and electronic devices may be provided in the vehicle. For example, a vehicle may include an Advanced Driver Assistance System (ADAS). In some cases, the vehicle may be an autonomous vehicle.

The advanced driver assistance system (ADAS) may be improved for user's convenience and safety while driving a vehicle.

For example, in order to effectively transmit electronic Horizon (eHorizon) data to autonomous driving systems and infotainment systems, the European Union Original Equipment Manufacturing (EU OEM) Association has established a data specification and transmission method as a standard, namely "Advanced Driver Assistance Systems Interface Specification (ADASIS)."

In some cases, eHorizon software may be an integral part of safety/ECO/convenience of autonomous vehicles in a connected environment.

SUMMARY

The present disclosure describes a communication device that allows autonomous driving of a vehicle in an optimized manner, a control method thereof, and a communication system including the same.

The present disclosure also describes a communication device capable of minimizing a bottleneck caused by a plurality of vehicles entering a predetermined area at the same time, a control method thereof, and a communication system including the same.

According to one aspect of the subject matter described in this application, a communication device includes a processor and a communication unit configured to receive first path information from a first vehicle and to receive second path information from a second vehicle. The processor is configured to determine a possibility of the first and second vehicles entering a predetermined area based on the first and second path information, and based on the possibility being greater than a reference, transmit, through the communication unit, a message for controlling at least one of the first vehicle or the second vehicle to allow the first and second vehicles to enter the predetermined area at different time points.

Implementations according to this aspect may include one or more of the following features. For example, the processor is configured to control the communication unit to transmit at least a portion of the first path information to the second vehicle. In some examples, the processor may be configured to determine a first portion of the first path information that satisfies a reference condition, and transmit, to the second vehicle, a second portion of the first path information that does not include the first portion of the first path information. In some examples, the first portion of the first path information may include at least one of vehicle information corresponding to the first vehicle or personal information corresponding to a passenger in the first vehicle.

In some implementations, the processor may be configured to select one of the first vehicle or the second vehicle based on the first and second path information, and transmit the message to the selected one of the first vehicle or the second vehicle. In some implementations, the processor may be configured to select one of the first vehicle or the second vehicle that may be capable of at least one of accelerating, decelerating, or changing a traveling direction without driver intervention, and transmit the message to the selected one of the first vehicle or the second vehicle.

In some examples, the processor may be configured to select one of the first vehicle or the second vehicle that travels at a speed slower than a speed of the other of the first vehicle or the second vehicle. In some examples, the processor may be configured to select one of the first vehicle or the second vehicle that has a communications service quality greater than a communications service quality of the other of the first vehicle or the second vehicle.

In some implementations, the processor may be configured to generate third path information based on the first and second path information to allow the first and second vehicles to enter the predetermined area at the different time points. In some examples, the processor may be configured to transmit the third path information to the one of the first vehicle or the second vehicle, where the third path information includes dynamic information for guiding the other of the first vehicle or the second vehicle.

In some examples, the predetermined area may include a lane corresponding to an intersection of a plurality of lanes. In some examples, the predetermined area may include a road without a centerline. In some examples, the message may include a speed control command for changing a speed of the at least one of the first vehicle or the second vehicle.

According to another aspect, a control method includes receiving first path information from a first vehicle, receiving second path information from a second vehicle, determining a possibility of the first and second vehicles entering a predetermined area based on the first and second path information, and based on the possibility being greater than a reference, transmitting a message for controlling at least one of the first vehicle or the second vehicle to allow the first and second vehicles to enter the predetermined area at different time points.

Implementations according to this aspect may include one or more of the following features. For example, the control method may further include determining a first portion of the first path information that satisfies a reference condition, and transmitting, to the second vehicle, a second portion of the first path information that does not include the first portion of the first path information. In some examples, the first portion of the first path information may include at least one of vehicle information corresponding to the first vehicle or personal information corresponding to a passenger in the first vehicle.

In some implementations, the control method may include generating third path information based on the first and second path information to allow the first and second vehicles to enter the predetermined area at the different time points, and transmitting the third path information to at least one of the first vehicle or the second vehicle. The third path information may include dynamic information for guiding the other of the first vehicle or the second vehicle.

In some implementations, transmitting the message may include selecting one of the first vehicle or the second vehicle based on the first and second path information, and transmitting the message to the selected one of the first vehicle or the second vehicle. In some examples, the message may include a speed control command for changing a speed of the at least one of the first vehicle or the second vehicle.

In some implementations, the control method may include setting the predetermined area based on a map data, where the predetermined area may include at least one of a lane corresponding to an intersection of a plurality of lanes or a road without a centerline.

In some cases, a plurality of vehicles entering a predetermined area (or range) at the same time may be reduced or minimized, depending on an occurrence of an event on the road, road characteristics (features) and situations, thereby eliminating or minimizing a bottleneck in the predetermined area.

BRIEF DESCRIPTION OF THE DRAWINGS

FIG. 3 is a flowchart illustrating an example of a control method of a communication device.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In this application, a suffix such as "module" and "unit" may be used to refer to elements, components, devices, hardware, or software.

A vehicle may include various types of automobiles such as cars, motorcycles, and the like. Hereinafter, the vehicle will be described based on a car.

Figure 1A:
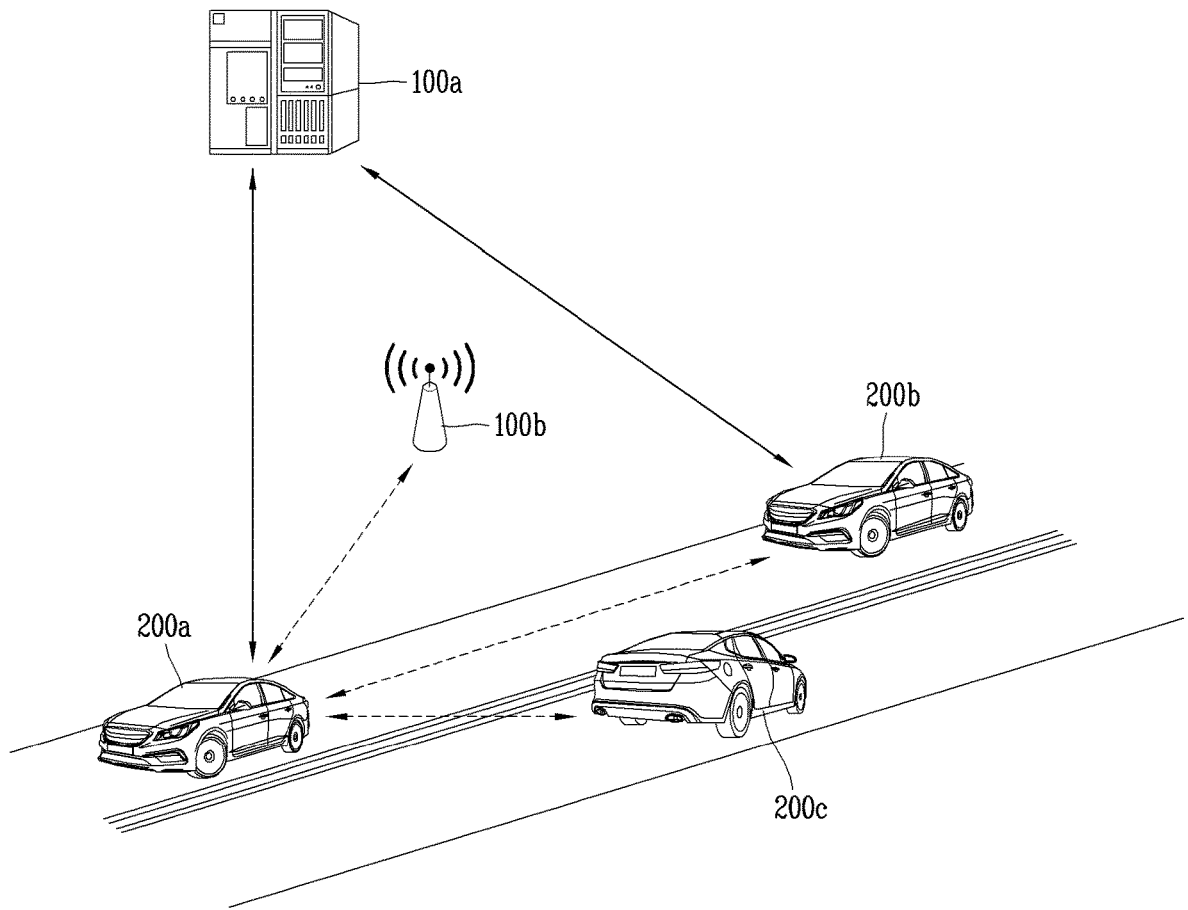
FIG. 1A is a diagram illustrating an example of a communication device and an example of a communication system.
Figure 1B:
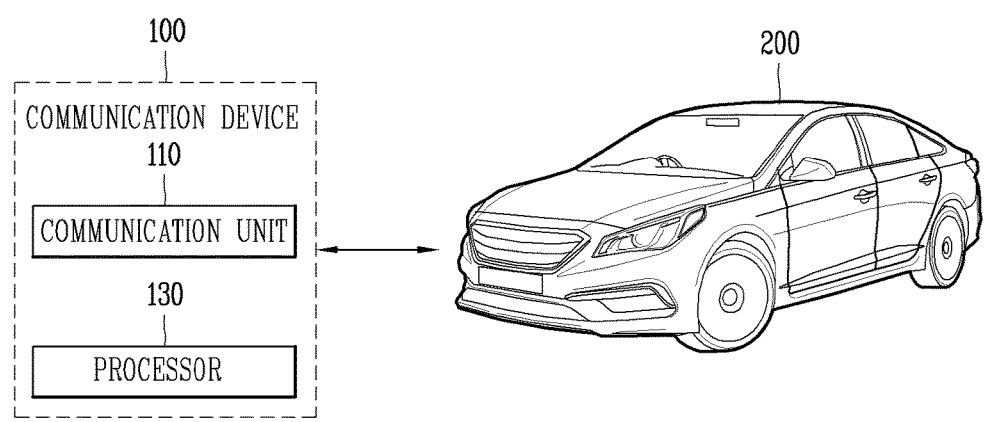
FIG. 1B is a block diagram illustrating the communication device of FIG. 1A.

FIG. 1A is a diagram illustrating an example of a communication device and an example of a communication system, and FIG. 1B is a block diagram illustrating the communication device of FIG. 1A.

A communication system includes a communication device 100 and a vehicle 200.

Communication devices 100a and 100b that correspond to a server, a base station, and an infrastructure of V2I may communicate with at least one of vehicles 200a to 200c to generate a control message for controlling each of the vehicles.

For example, the communication devices 100a and 100b may receive first path (or route) information from the first vehicle 200a, which is generated by the first vehicle 200a, and generate a control message to control the first vehicle 200a based on the first path information.

The control message may be interconnected (or linked) to various control functions for setting or resetting a destination of the first vehicle 200a, changing a driving (or drive) mode, controlling brake or engine/motor to adjust a speed, controlling a steering system to change a driving direction, etc.

The communication device 100 includes a communication unit 110 and a processor 130.

The communication unit 110 is configured to communicate with the vehicle 200. The communication unit 110 may receive various information provided from the vehicle 200 through an antenna and transmit information related to a geo-fence to the vehicle 200 under the control of the processor 130.

The communication unit 110 may communicate with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic conditions and the like, while communicating with a road infrastructure and other vehicles during driving.

Furthermore, the communication unit 110 may be configured to perform telematics communication. The telematics communication refers to a network that may communicate with a server and the like by using a satellite navigation system or a base station provided by mobile communications such as 4G or 5G. For instance, the communication unit 110 may include an electric circuit, a processor, a controller, a transceiver, or the like. In some cases, the communication unit 110 may be included in the processor 130.

V2X communication is relatively narrow in terms of a communication available range, as it is direct communication without a repeater. On the other hand, telematics is relatively wide in terms of the communication available range, as it is indirect communication through a repeater. The V2X communication is only allowed when a communication counterpart is within a communication available range. However, as for the telematics communication, a communication counterpart is determined and communication is available in almost all regions.

The communication unit 110 may receive information related to driving of the vehicle from most of devices provided in the vehicle 200. The information transmitted from the vehicle 200 to the communication device 100 is referred to as 'vehicle driving information (or vehicle travel information)'.

Vehicle driving information includes vehicle information and surrounding information related to the vehicle. Information related to the inside of the vehicle with respect to the frame of the vehicle 200 may be defined as the vehicle information, and information related to the outside of the vehicle may be defined as the surrounding information.

The vehicle information refers to information related to the vehicle itself. For example, the vehicle information may include a traveling speed, a traveling direction, an acceleration, an angular velocity, a location (GPS), a weight, the number of passengers on board the vehicle, a braking force of the vehicle, a maximum braking force, air pressure of each wheel, a centrifugal force applied to the vehicle, a driving (or drive) mode of the vehicle (autonomous driving mode or manual driving mode), a parking mode of the vehicle (autonomous parking mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (or following) vehicle, a relative speed of a preceding (or following) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (e.g., whether or not the user is an authenticated user), and the like.

The surrounding information may also include ambient brightness, temperature, a position of the sun, information related to a nearby subject (a person, another vehicle, a sign, etc.), a type of a driving road surface, a landmark, (traffic) line information, and driving lane information, and information required for an autonomous travel/autonomous parking/automatic parking/manual parking mode.

In addition, the surrounding information may further include a distance from an object nearby to the vehicle 200, collision possibility, a type of an object, a parking space for the vehicle, an object for identifying the parking space (e.g., a parking line, a string, another vehicle, a wall, etc.), and the like.

The vehicle driving information may include path or route information. The path information means information generated by a path (or route) providing device that provides a route to the vehicle 200.

For example, when a destination is set in the vehicle 200, the path information may be information for guiding a driving (or travelling) path to the destination in lane units (or according to each lane).

As another example, when a destination is not set for the vehicle 200, the path information may be information for guiding a main path (Most Preferred Path, MPP) that the vehicle is most likely to travel in the lane units. Here, the path information may further include sub path information related to a sub path, which is branched from the main path (MPP) and on which the vehicle 200 is likely to travel with a higher probability than a predetermined reference.

According to the path information, it is possible to predict when and which lane the vehicle 200 will move to.

The vehicle driving information is not limited to the example described above and may include all information generated from the components provided in the vehicle 200.

The processor 130 may determine whether or not at least one of a plurality of preset or predetermined conditions is satisfied, based on vehicle driving information received through the communication unit 110. According to a satisfied condition, the processor 130 may perform different controls.

Based on the predetermined conditions, the processor 130 may detect an occurrence of an event in an electric component provided in the vehicle 200 and/or application, and determine whether the detected event meets a predetermined condition. Here, the processor 130 may detect the occurrence of the event from information received through the communication unit 110.

The application that includes a widget, a home launcher, and the like refers to all types of programs that may be run on the vehicle 200. Accordingly, the application may be a program that performs a function of a web browser, a video playback, a message transmission/reception, a schedule management, or an application update.

In addition, the application may include at least one of forward collision warning (FCW), blind spot detection (BSD), lane departure warning (LDW), pedestrian detection (PD), Curve Speed Warning (CSW), and turn-by-turn navigation (TBT).

For example, the occurrence of the event may be a missed call, presence of an application to be updated, a message arrival, start on, start off, autonomous travel on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For instance, the occurrence of the event may be an occurrence of forward collision warning, an occurrence of blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 200 perform specific functions, it may be determined as the occurrence of the event.

In some implementations, the communication device 100 may be provided with a memory (a non-transitory memory).

The memory may be configured to store data to support various functions of the communication device 100. The memory may be configured to store application programs (or applications) executed in the communication device 100, data or instructions for operations of the communication device 100, and the like. Some of these application programs may be downloaded from an external server via wireless communication. Other application programs may be installed within the communication device 100 at the time of manufacturing or shipping, which is typically the case for basic functions of the communication device 100 (for example, geo-fence setting, alarm related to geo-fence, etc.) In some examples, the application programs, which are stored in the memory and installed on the communication device 100, may be executed by the processor 130 to perform operations (or functions) for the communication device 100.

The processor 130 may control an overall operation of the communication device 100, in addition to the operations associated with the application programs. The processor 130 may provide or process information or functions appropriate for the vehicle 200 by processing signals, data, information and the like, which are input or output through the communication unit 110, or activating application programs stored in the memory. For instance, the processor 130 may include an electric circuit, an integrated circuit, or the like.

Before discussing operations performed by the communication device 100, path information provided to the communication device 100 by the vehicle 200 will be described in detail.

Figure 2:
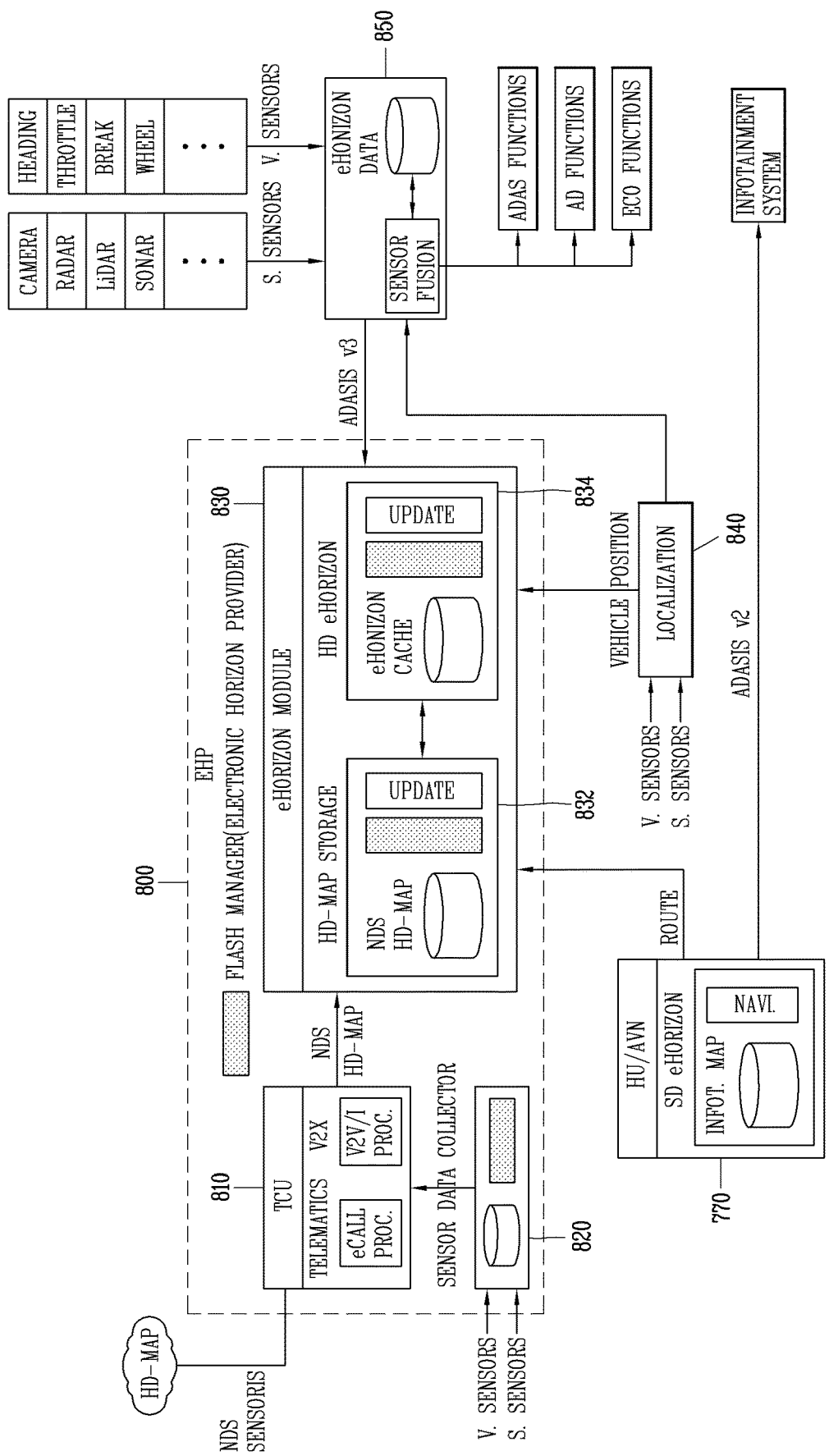
FIG. 2 is a block diagram illustrating an example of a path providing device for generating route information.

FIG. 2 is a block diagram illustrating a path providing device for generating path information.

A path providing device 800 may be a device (or system) that provides information regarding a path to a vehicle, and be referred to as an Electronic Horizon Provider (EHP)

For example, the path providing device 800 may be a device mounted on a vehicle to perform communication through may communication and generate messages for controlling the vehicle and/or electric components mounted on the vehicle.

As another example, the path providing device 800 may be located outside the vehicle, like a server or a communication device, and may perform communication with the vehicle through a mobile communication network. In this case, the path providing device 800 may remotely control the vehicle and/or the electric components mounted on the vehicle using the mobile communication network.

The path providing device 800, which is provided in the vehicle, may be implemented as an independent device detachable from the vehicle or may be integrally installed on the vehicle to construct a part of the vehicle.

Electronic Horizon may be referred to as 'ADAS Horizon', 'ADASIS Horizon', 'Extended Driver Horizon' or 'eHorizon'.

The eHorizon may be understood as software, a module or a system that performs the role of generating a vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (e.g., an ECU, a controller, a navigation system 770, etc.) of the vehicle or in the vehicle requiring map information (or path information).

The path providing device 800 may include a communication unit 810 and a processor 830. The communication unit 810 is configured to communicate with various components provided in the vehicle.

For example, the communication unit 810 may receive various information provided through a controller area network (CAN).

The communication unit 810 may include a first communication module, and the first communication module may receive an HD map provided through telematics. In other words, the first communication module is configured to perform 'telematics communication'. The first communication module performing the telematics communication may perform communication with a server and the like by using a satellite navigation system or a base station provided by mobile communications such as 4G or 5G.

The first communication module may perform communication with a telematics communication device. The telematics communication device may include a server provided by a portal provider, a vehicle provider and/or a mobile communication company.

The processor 830 of the path providing device 800 may determine absolute coordinates of road-related information (event information) based on ADAS MAP received from an external server (eHorizon) through the first communication module. In addition, the processor 830 may control autonomous driving of the vehicle or perform a vesicle control using the absolute coordinates of the road-related information (event information). autonomously drive the vehicle or perform a vehicle control using the absolute coordinates of the road-related information (event information).

The communication unit 810 may include a second communication module, and the second communication module may receive various types of information provided through vehicle to everything (V2X) communication. In other words, the second communication module is configured to perform 'V2X communication'. The V2X communication may be defined as a technology of exchanging or sharing information, such as traffic condition and the like, while communicating with road infrastructures and other vehicles during driving.

The second communication module may perform communication with a V2X communication device. The V2X communication device may include a mobile terminal belonged to a pedestrian or a person riding a bike, a fixed terminal installed on a road, another vehicle, and the like.

Here, the another vehicle may denote at least one of vehicles existing within a predetermined distance from the path providing device 800 or vehicles approaching by a predetermined distance or shorter with respect to the vehicle.

The present disclosure may not be limited thereto, and the another vehicle may include all the vehicles capable of communicating with the communication unit 810. According to this specification, for the sake of explanation, an example will be described in which the another vehicle is at least one vehicle existing within a predetermined distance from the vehicle or at least one vehicle approaching by a predetermined distance or shorter with respect to the vehicle.

The predetermined distance may be determined based on a distance capable of performing communication through the communication unit 810, determined according to a specification of a product, or determined/varied based on a user's setting or V2X communication standard.

The second communication module may be configured to receive LDM data from another vehicle. The LDM data may be a V2X message (BSM, CAM, DENM, etc.) transmitted and received between vehicles through V2X communication.

The LDM data may include position information related to another vehicle.

The processor 830 may determine a position of the vehicle 200 of the present disclosure relative to the another vehicle, based on the position information related to the vehicle 200 and the position information related to the another vehicle included in the LDM data received through the second communication module.

In addition, the LDM data may include speed information regarding another vehicle. The processor 830 may also determine a relative speed of the another vehicle using speed information of the vehicle 200 of the present disclosure and the speed information of the another vehicle. The speed information of the vehicle 200 may be calculated using a degree to which the location information of the vehicle received through the communication unit changes over time, or calculated based on information received from a driving operation device or a power train driving unit of the vehicle 200.

In some examples, the eHorizon may be classified into categories such as software, a system, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems.

In some systems, the vehicle's forward path (or a path to the destination) is only provided as a single path based on a navigation map. By contrast, according to some implementations described in the present disclosure, eHorizon may provide lane-based path information based on a high-definition (HD) map.

Data generated by eHorizon may be referred to as 'electronic horizon data' or 'eHorizon data'.

The electronic horizon data may be described as driving plan data used when generating a driving control signal of the vehicle 200 in a driving (traveling) system. For example, the electronic horizon data may be understood as driving plan data in a range from a point where the vehicle 200 is located to horizon.

Here, the horizon may be understood as a point in front of the point where the vehicle 200 is located, by a predetermined distance, on the basis of a predetermined travel path. The horizon may refer to a point where the vehicle 200 is to reach after a predetermined time from the point, at which the vehicle 200 is currently located, along a predetermined travel path. Here, the travel path refers to a path for the vehicle to travel up to a final destination, and may be set by a user input.

Electronic horizon data may include horizon map data and horizon path data. The horizon map data may include at least one of topology data, ADAS data, HD map data, and dynamic data. In some implementations, the horizon map data may include a plurality of layers. For example, the horizon map data may include a first layer that matches topology data, a second layer that matches ADAS data, a third layer that matches HD map data, and a fourth layer that matches dynamic data. The horizon map data may further include static object data.

Topology data may be described as a map created by connecting road centers. Topology data is suitable for roughly indicating the position of a vehicle and may be in the form of data mainly used in a navigation for a driver. Topology data may be understood as data for road information excluding lane-related information. Topology data may be generated based on data received by an infrastructure through V2I. Topology data may be based on data generated in an infrastructure. Topology data may be based on data stored in at least one memory included in the vehicle 200.

ADAS data may refer to data related to road information. ADAS data may include at least one of road slope data, road curvature data, and road speed limit data. ADAS data may further include no-passing zone data. ADAS data may be based on data generated in an infrastructure. ADAS data may be based on data generated by an object detecting apparatus. ADAS data may be referred to as road information data.

HD map data may include detailed lane-unit topology information of a road, connection information of each lane, and feature information for localization of a vehicle (e.g., traffic signs, lane marking/attributes, road furniture, etc.). HD map data may be based on data generated in an infrastructure.

Dynamic data may include various dynamic information that may be generated on a road. For example, the dynamic data may include construction information, variable-speed lane information, road surface state information, traffic information, moving object information, and the like. Dynamic data may be based on data received from an infrastructure. Dynamic data may be based on data generated by the object detecting apparatus.

The path providing device 800 may provide map data within a range from a point where the vehicle 200 is located to the horizon. The horizon path data may be described as a trajectory that the vehicle 200 may take within the range from the point where the vehicle 200 is located to the horizon. The horizon path data may include data indicating a relative probability to select one road at a decision point (e.g., fork, intersection, crossroads, etc.). Relative probability may be calculated based on a time taken to arrive at a final destination. For example, if a shorter time is taken to arrive at the final destination when selecting a first road than when selecting a second road at a decision point, the probability to select the first road may be calculated higher than the probability to select the second road.

The horizon path data may include a main path and a sub path. The main path may be understood as a trajectory connecting roads with a higher relative probability to be selected. The sub path may be merged with or diverged from at least one point on the main path. The sub path may be understood as a trajectory connecting at least one road having a low relative probability to be selected at the at least one decision point on the main path.

eHorizon may be classified into categories such as software, a system, and the like. eHorizon denotes a configuration of fusing real-time events, such as road shape information of a high-definition map, real-time traffic signs, road surface conditions, accidents and the like, under a connected environment of an external server (cloud server), V2X (Vehicle to everything) or the like, and providing the fused information to the autonomous driving system and the infotainment system.

In other words, eHorizon may perform the role of transferring a road shape on a high-definition map and real-time events with respect to the front of the vehicle to the autonomous driving system and the infotainment system under an external server/V2X environment.

In order to effectively transfer eHorizon data (information) transmitted (or generated) from eHorizon to the autonomous driving system and the infotainment system, a data specification and transmission method may be formed in accordance with a technical standard called "Advanced Driver Assistance Systems Interface Specification (ADASIS)."

In some examples, eHorizon may refer to an external server (a cloud or a cloud server).

For instance, eHorizon may perform the role of transferring a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called 'Advanced Driver Assistance Systems Interface Specification (ADASIS)'.

The path providing device 800 related to the present disclosure may use information, which is received from eHorizon, in the autonomous driving system and/or the infotainment system.

For example, the autonomous driving system may be divided into a safety aspect and an ECO aspect.

In terms of the safety aspect, the path providing device 800 may perform an Advanced Driver Assistance System (ADAS) function such as Lane Keeping Assist (LKA), Traffic Jam Assist (TJA) or the like, and/or an AD (Auto-Drive) function such as passing, road joining, lane change or the like, by using road shape information and event information received from eHorizon and surrounding object information sensed through a sensing unit (or sensor) 840 provided in the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect.

For example, the path providing device 800 may receive accident information, road surface condition information, and the like on a front road from eHorizon to output them on a display unit (e.g., Head Up Display (HUD), CID, Cluster, etc.) provided in the vehicle, so as to provide guidance information for the driver to drive the vehicle safely.

eHorizon (external server) may receive position information related to various types of event information (e.g., road surface condition information, construction information, accident information, etc.) occurred on roads and/or road-based speed limit information from the vehicle 200 or other vehicles or may collect such information from infrastructures (e.g., measuring devices, sensing devices, cameras, etc.) installed on the roads.

Furthermore, the event information and the road-based speed limit information may be linked to map information or may be updated.

In addition, the location information related to the event information may be divided into lane units.

By using such information, the eHorizon (external server) of the present disclosure may provide information necessary for the autonomous driving system and the infotainment system to each vehicle, based on a high-definition map capable of determining a road situation (or road information) in units of lanes of the road.

In other words, the eHorizon (external server) of the present disclosure may provide an absolute high-definition map using absolute coordinates of road-related information (e.g., event information, position information regarding the vehicle, etc.) based on a high-definition map.

The road-related information provided by the eHorizon may be information corresponding to a predetermined region (predetermined space) with respect to the vehicle 200.

In some examples, the path providing device 800 of the present disclosure may acquire position information related to another vehicle through communication with the another vehicle. Communication with the another vehicle may be performed through V2X (Vehicle to Everything) communication, and data transmitted/received to/from the another vehicle through the V2X communication may be data in a format defined by a Local Dynamic Map (LDM) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the aforementioned ADAS MAP in the data format and transmission method. For example, the ADAS MAP may correspond to a high-definition map having absolute coordinates received from eHorizon (external server), and the LDM may denote a high-definition map having relative coordinates based on data transmitted and received through V2X communication.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication).

The LDM may be implemented, for example, by a storage for storing data transmitted and received through V2X communication, and the LDM may be formed (stored) in a vehicle control device provided in each vehicle.

The LDM data may denote data exchanged between a vehicle and a vehicle (infrastructure, pedestrian) or the like, for example. The LDM data may include a Basic Safety Message (BSM), a Cooperative Awareness Message (CAM), and a Decentralized Environmental Notification message (DENM), and the like, for example.

The LDM data may be referred to as a V2X message or an LDM message, for example.

The path providing device related to the present disclosure may efficiently manage LDM data (or V2X messages) transmitted and received between vehicles using the LDM.

Based on LDM data received via V2X communication, the LDM may store, distribute to another vehicle, and continuously update all relevant information (for example, a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For example, a V2X application provided in the path providing device 800 registers in the LDM, and receives a specific message such as all the DENMs in addition to a warning about a broken vehicle. Then, the LDM may automatically assign the received information to the V2X application, and the V2X application may control the vehicle based on the information assigned from the LDM.

As described above, the vehicle of the present disclosure may control the vehicle using the LDM formed by the LDM data collected through V2X communication.

The LDM associated with the present disclosure may provide road-related information to the vehicle control device. The road-related information provided by the LDM provides only a relative distance and a relative speed with respect to another vehicle (or an event generation point), other than map information having absolute coordinates.

In other words, the vehicle of the present disclosure may perform autonomous driving using an ADAS MAP (absolute coordinates HD map) according to the ADASIS standard provided by eHorizon, but the map may be used only to determine a road condition in a surrounding area of the vehicle.

In addition, the vehicle of the present disclosure may perform autonomous driving using an LDM (relative coordinates HD map) formed by LDM data received through V2X communication, but there is a limitation in that accuracy is inferior due to insufficient absolute position information.

The path providing device 800 may generate a fused definition map using the ADAS MAP received from the eHorizon and the LDM data received through the V2X communication, and control the vehicle in an optimized manner using the fused definition map.

The processor 830 may generate forward path information for guiding a road located ahead of the vehicle in lane units using the HD map.

The processor 830 may generate different forward path information depending on whether a destination is set in the vehicle.

For example, when a destination is set in the vehicle, the processor 830 may generate forward path information for guiding a driving (or travelling) path to the destination in the lane units.

As another example, when a destination is not set in the vehicle, the processor 830 may calculate a main path (Most Preferred Path (MPP)) on which the vehicle is most likely to travel, and generate forward path information for guiding the main path (MPP) in the lane units. In this case, the path information may further include sub path information related to a sub path, which is branched from the main path (MPP) and on which the vehicle 200 is likely to travel with a higher probability than a predetermined reference.

The path information may provide a driving path up to a destination for each lane drawn on the road, thereby providing more precise and detailed path information. The path information may be path information that complies with the standard of ADASIS v3.

The path information may be provided by subdividing a path, on which the vehicle should travel or may travel, into lane units. The path information may be information for guiding a driving path to a destination in lane units. (on the lane basis) When the path information is displayed on a display mounted on the vehicle, a guide line for guiding a lane on which the vehicle 200 may travel may be displayed on the map. In addition, a graphic object indicating the position of the vehicle may be included on at least one lane in which the vehicle is located among a plurality of lanes included in a map.

The processor 830 may provide the path information to at least one electric component provided in the vehicle. In addition, the processor 830 may also provide the path information to various applications installed in the systems of the vehicle.

The electric component means all kinds of devices installed on the vehicle 200 capable of performing communication. For example, the object detecting apparatus such as a radar or a LiDAR, the navigation system, the vehicle driving apparatus, and the like may be included in the electric components.

The electric component may perform its own function based on the path information.

The path information may include a path in lane units and the location of the vehicle 200, and may include dynamic information including at least one object to be sensed by the electric component. The electric component may reallocate resources to sense an object corresponding to the dynamic information, determine whether the dynamic information matches sensing information sensed by the electric component itself, or change a setting value for generating sensing information.

Operations of the communication device 100 based on the path information transmitted from the vehicle 200 will be described in detail.

Figure 4A:
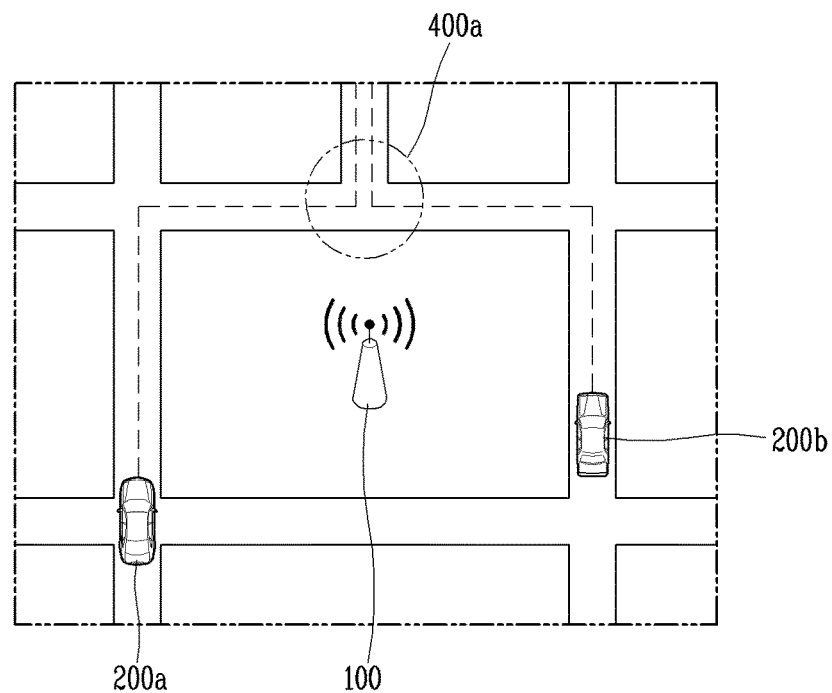
FIGS. 4A, 4B, and 4C are diagrams illustrating examples of the control method of FIG. 3.
Figure 4B:
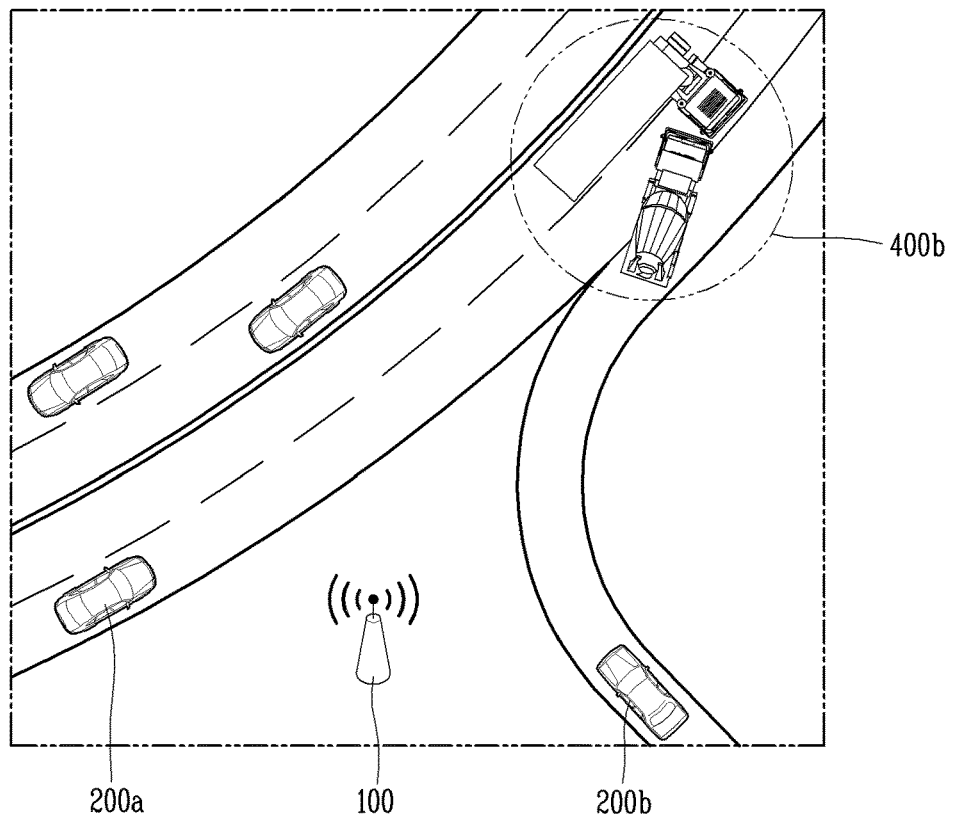
Figure 4C:
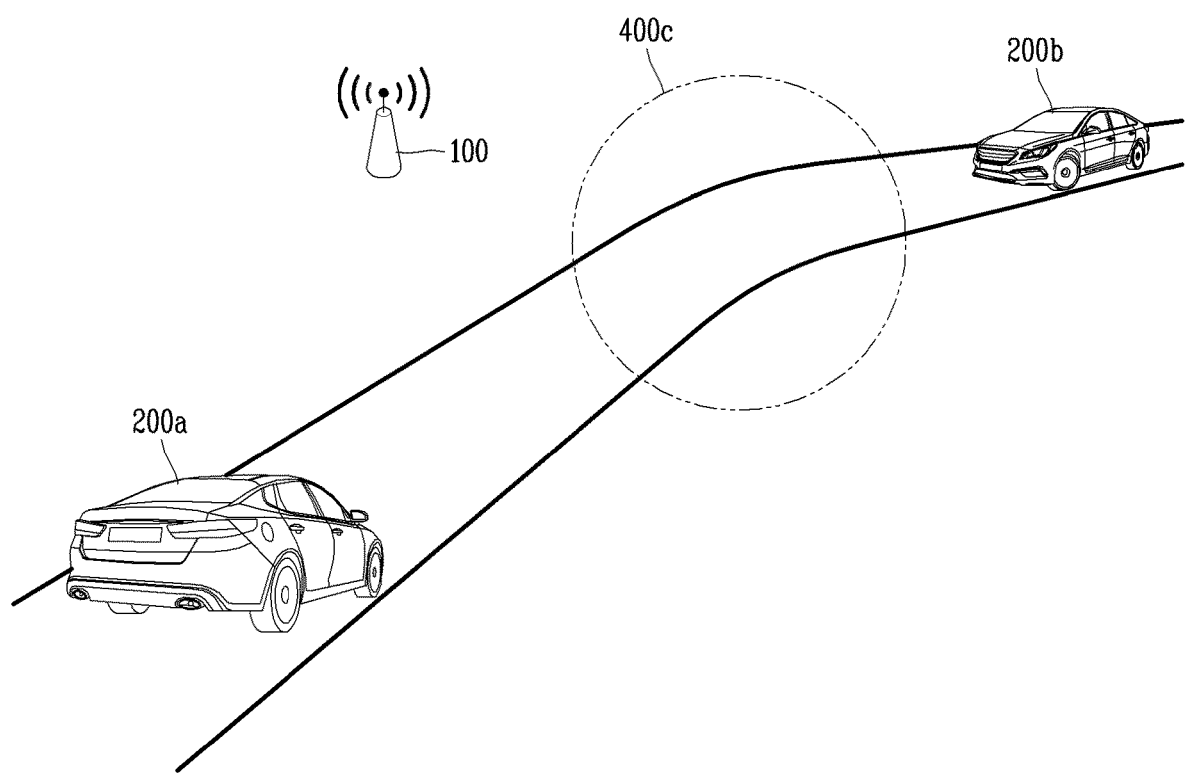

FIG. 3 is a flowchart illustrating an example control method of a communication device, and FIGS. 4A, 4B, and 4C are diagrams illustrating examples according to the control method of FIG. 3.

The processor 130 of the communication device 100 receives first path information from a first vehicle through the communication unit 110 (S310), and receives second path information from a second vehicle (S330).

The communication device 100 that corresponds to a server, a base station, and an infrastructure of V2I may communicate with one or more vehicles. In addition, the communication device 100 may receive path (or route) information for guiding a path from each of a plurality of vehicles.

The communication device 100 may receive path information from at least two or more vehicles. However, for convenience of description, first and second vehicles will be used for describing the present disclosure.

The communication device 100 may receive first and second path information from the first and second vehicles, respectively, using V2X communication and/or telematics communication.

The processor 130 calculates a possibility of the first and second vehicles entering a predetermined range based on the first and second path information. In detail, the processor 130 may calculate at least one of the predetermined range and an estimated time point at which each of the vehicles is expected to enter the predetermined range based on the first and second path information.

The predetermined range may be referred to as a 'geofence'.

A geo-fence (or geofence), which is a combined word of 'geography' and 'fence', is a term that refers to a virtual fence or perimeter created based on a real-world geographic area. The geo-fence may be used to record real-time location (or position) of the user and access information in combination with other assistive technologies, for example, networks such as Wi-Fi and cellular data, and beacons. When a mobile device containing location information enters a designated area, a predetermined operation (or act), such as text messages, e-mails, and app notifications, may be performed according to a given condition.

Developers mark a location by latitude and longitude, and add a radius to this to create a fenced area or zone where the geo-fence works. When a user's location calculated by a mobile device is transmitted to a server, the server calculates a space between the received user's location and the geo-fence. Then, when the user enters the geo-fence zone, surrounding information may be transferred back to the mobile device.

Geo-fence enabled applications or platforms may determine how long a user or mobile device stays in this zone, from where they enter the zone, when they leave the zone, and their current location, and send shopping information nearby or coupons depending on a condition. This may allow the user to more deeply interact with an object or terrain nearby in real time.

The geo-fence may be an inside of a building, a large factory site, a circular area with a large radius, or an area having a complex polygonal shape.

The geo-fence may be variably set according to an occurrence of an event on the road, road characteristics and situations, and the amount of traffic.

For example, as illustrated in FIG. 4A, a first communication device 100a may monitor a predetermined area including a plurality of intersections.

Here, monitoring is to analyze path information received from vehicles and to search for an area (place or point) for a bottleneck to occur, due to encountering of at least two vehicles, according to a predetermined algorithm.

Based on first path information 210a received from a first vehicle 200a and second path information 210b received from a second vehicle 200b, the first communication device 100a may determine an area where a bottleneck is expected to occur as a predetermined range 400a. Here, the predetermined range 400a may be changed in real time according to at least one of a speed and a driving direction of the first and second vehicles 200a and 200b.

The geo-fence may be set in advance. The geo-fence may be fixed without being variable unless modified by the developers.

For example, as illustrated in FIG. 4B, an area where two lanes merge into one may be set as a predetermined range 400b in a ramp, which is an auxiliary road connecting two separated stereoscopic lanes. Any one lane where a plurality of lanes joins at an intersection may be set as the predetermined range 400b.

As another example, as illustrated in FIG. 4C, a predetermined range 400c may be set at a point on the road where vehicles traveling in opposite directions towards each other may meet due to there is no centerline.

The geo-fence may be set up in an area where accidents occur frequently, or at an intersection or a ramp.

The processor 130 may analyze road features (or characteristics) included in a predetermined area using a map stored in a memory or provided from a server or the like.

Here, the road characteristics may include a width of the road, a type and grade of the road, a shape of the road, the number and type of lanes, legal binding effects set in each lane, and the like.

The processor 130 may search for a specific area that needs to be set as a geo-fence according to a predetermined algorithm using the road characteristics. An area where accidents occur frequently, or one area (or spot) of the road that requires a warning to the following (or rear-side) vehicle about a situation ahead may be searched for the predetermined area. If the searched specific area satisfies a reference condition, it is set as the geo-fence. At least one of a location, size and shape of the geo-fence may be defined in different ways according to characteristics of the road.

For example, the processor 130 may automatically set the geo-fence according to a predetermined algorithm. In some examples, the geo-fence may be set manually according to a user input.

The processor 130 transmits a message for controlling at least one of the first and second vehicles to the at least any one of them, so that the first and second vehicles enter the predetermined range at different time points when the possibility is higher than a reference. (S370).

The message may be a speed control command for changing the speed of the at least one of the vehicles.

For example, a message may be generated such that the second vehicle passes the predetermined range after the first vehicle passed by the predetermined range. Here, a first message for controlling the speed of the first vehicle to be higher than the current speed and/or a second message for controlling the speed of the second vehicle to be lower than the current speed may be transmitted.

The message may be a path change command to change a travelling route of the at least one of the vehicles. For example, the message may include a path change command to change the lane of any one of the vehicles, or to change the route to a bypass road.

When a vehicle is driven autonomously, the vehicle may execute a predetermined function that affects autonomous driving, in response to the message. Here, the predetermined function may include at least one of a function related to brake operation for changing a traveling speed of the vehicle, an acceleration function of increasing an engine's output (power), a deceleration function of decreasing the engine's output, a traveling direction changing function for changing a traveling direction of the vehicle, and an emergency stop function for a vehicle stop.

When a vehicle is driven manually, the vehicle may output notification information for calling attention to the driver in response to the message in at least one of a visual, audible and tactile manner. The notification information may include information regarding deceleration, acceleration, a lane change, and a path change, and the like.

A bottleneck event may occur when a plurality of vehicles encounter in a predetermined range 400. For example, one vehicle may be an object that interferes with driving of another vehicle during autonomous driving or manual driving. Accordingly, the communication device 100 may monitor the predetermined range 400 to allow a plurality of vehicles to pass through the predetermined range 400 at different time points, to thereby avoid occurrence of the bottleneck event.

In some implementations, a plurality of vehicles entering a predetermined range (area) at the same time may be reduced or minimized, depending on an occurrence of an event on the road, road features and situations. As a result, a bottleneck in the predetermined range may be eliminated or minimized.

Figure 5:
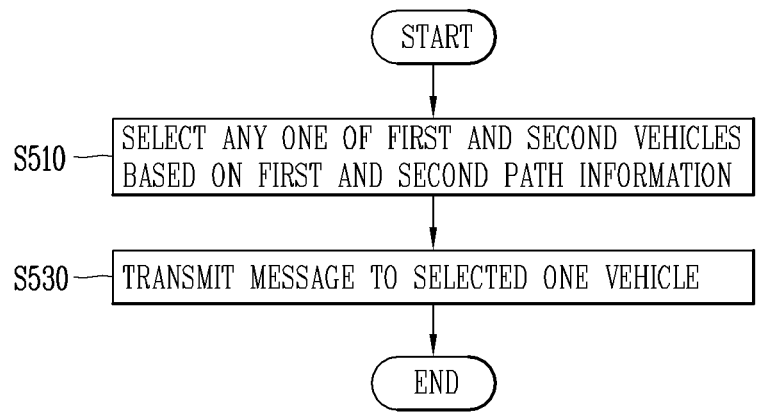
FIG. 5 is a flowchart illustrating an example method for selecting one of a plurality of vehicles by a communication device.

FIG. 5 is a flowchart illustrating a method of selecting one of a plurality of vehicles by a communication device.

The processor 130 may select any one of the first and second vehicles based on the first and second path information. This is because sending a message to the minimum number of vehicles is more efficient way of using resources than sending a message to all vehicles.

The processor 130 may select any one vehicle according to a predetermined reference (or criterion).

For example, of the first and second vehicles, the processor 130 may select a vehicle, capable of at least one of accelerating, decelerating, and changing a traveling direction without driver intervention, as the one vehicle. In other words, a vehicle that may be controlled by the communication device 100 may be selected.

When both the first and second vehicles may be controlled by the communication device 100, the processor 130 may select a vehicle traveling at a slower speed as the one vehicle. This is because it is possible to secure more time for controlling a vehicle when controlling a vehicle travelling at a slower speed than a vehicle travelling at a faster speed.

As another example, of the first and second vehicles, the processor 130 may select a vehicle having a better communications service quality as the one vehicle.

The processor 130 may measure communications service quality between the communication unit 110 and the first vehicle, and between the communication unit 110 and the second vehicle.

The communications service quality may include at least one of transmission quality, connection quality, and reliability. Here, the transmission quality refers to an error rate of a transmission signal. The connection quality, which is a measure of access to networks without an unreasonable delay, refers to a probability of call loss or connection latency. As for the reliability, its value may be calculated stochastically by an annual failure rate of each part of network.

The communications service quality may vary based on various implementations. For example, in the present disclosure, it may be calculated based on at least one of latency and a bandwidth.

In the case of selectively controlling any one vehicle, a vehicle having real-time property should be selected. Accordingly, of the first and second vehicles, the processor 130 may select a vehicle having better communications service quality as the one vehicle.

Next, the processor 130 transmits the message to the any one vehicle selected (S530). When the first vehicle is selected between the first and second vehicles, the second vehicle travels according to its second path information, but the first vehicle changes its first path information to travel. For example, the speed may be reduced or increased, or a lane or travelling path may be changed.

In some implementations, as the minimum number of vehicles is limitedly controlled instead of controlling all vesicles, resources of the communication device 100 may be efficiently used, thereby saving costs.

Figure 6:
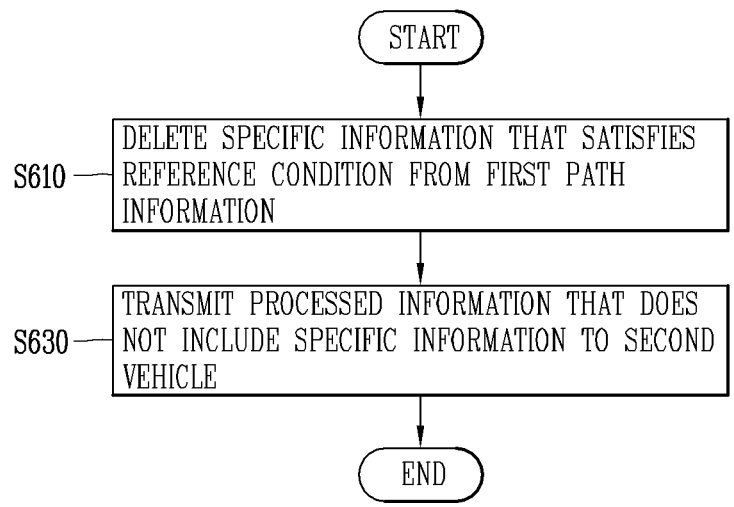
FIG. 6 is a flowchart illustrating an example method for providing path information generated from one vehicle to another vehicle.
Figure 7:
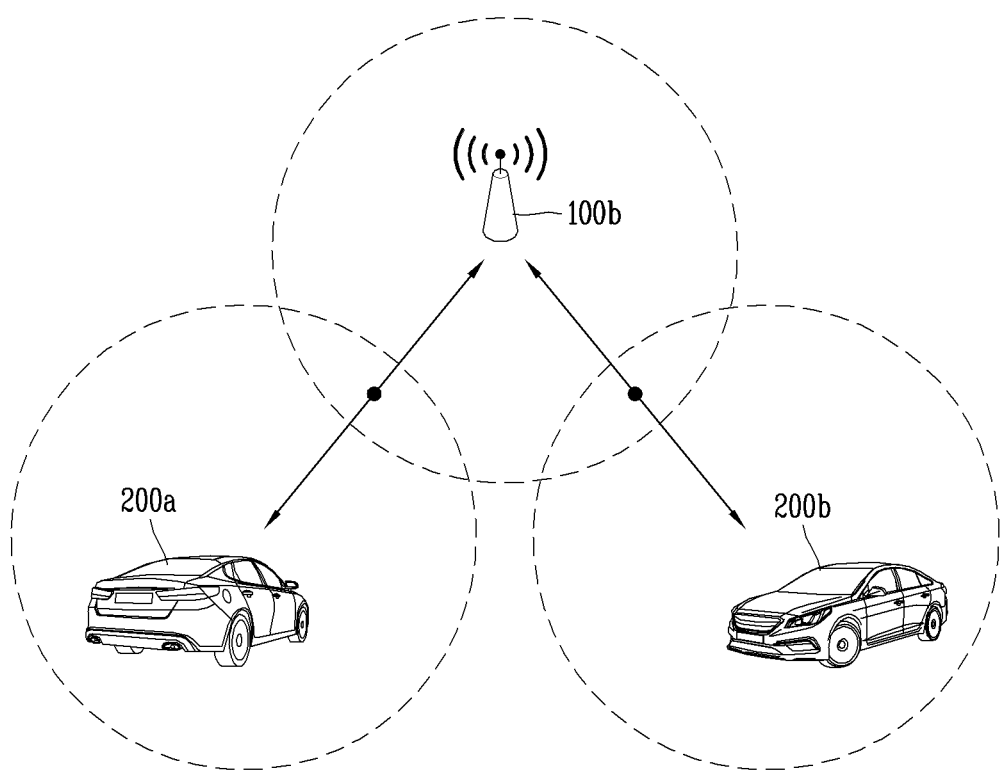
FIG. 7 is a diagram illustrating an example operation of a communication device.

FIG. 6 is a flowchart illustrating an example method for providing path information generated by one vehicle to another vehicle, and FIG. 7 is a diagram illustrating an example operation of a communication device.

The processor 830 may relay path information transmitted from one vehicle to another. For example, first path information transmitted from a first vehicle may be transmitted to a second vehicle, and second path information transmitted from the second vehicle may be transmitted to the first vehicle.

Path information may be relayed only when a bottleneck in the predetermined range, due to a plurality of vehicles approaching the predetermined range at the same, is expected to occur. In detail, when a probability of the first and second vehicles meeting in a predetermined area (range) is higher than a predetermined reference (or criterion), the processor 830 may share path information of the first and second vehicles with each other.

In general, there are many limitations associated with V2X communication. For example, a communication available range is limited, and even if it is located within the communication available range, communication cannot be smoothly performed when there are objects that interfere with communication, such as buildings and mountains.

However, telematics communication may solve such limitations of the V2X communication. The communication device 100 provides path information of one another to the first and second vehicles that do not recognize each other, thereby offering an opportunity for the first and second vehicles to avoid from each other.

As illustrated in FIG. 7, the first and second vehicles 200a and 200b do not sense each other because their communication available ranges do not overlap each other, and thus they travel according to their path information. The communication device 100 may communicate with the first and second vehicles 200a and 200b to transmit path information of one another. Accordingly, the first and second vehicles 200a and 200b may modify or adjust their path information in consideration of one another.

The path information may include at least one of vehicle information for recognizing the first vehicle 200a and personal information for recognizing a passenger on board the first vehicle 200a. In other words, specific (or predetermined) information satisfying a reference condition, which is information that should not be shared with the other party (or others), may be included in the path information.

The processor 830 may delete specific information that satisfies a reference condition from the first path information (S610), and transmit processed information that does not include the specific information to the second vehicle instead of the first path information (S630).

Figure 8:
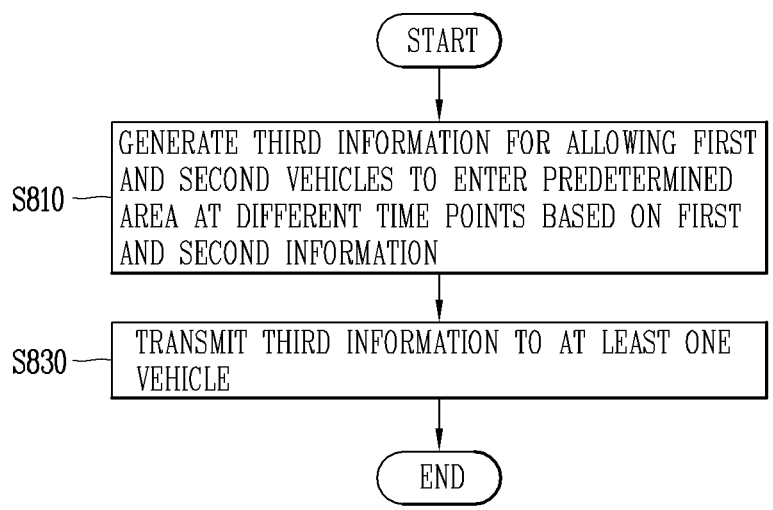
FIG. 8 is a flowchart illustrating an example method for generating new path information.

FIG. 8 is a flowchart illustrating an example method for generating new path information.

Third path information to allow the first and second vehicles to enter the predetermined range at different time points is generated by using the first and second path information (S810), and the third path information may be transmitted to the at least one of the first and second vehicles (S830).

The third path information means new path information for changing a route of at least one of the first and second vehicles. For example, when the first vehicle receives the third path information while driving according to the first path information, the first vehicle may change the first path information to the third path information.

In some examples, the processor 130 may set at least two or more vehicles having a higher possibility (higher than a reference) of meeting in the predetermined range as a group. The third path information may be information for guiding a route for the group to move or travel.

Vehicles set as the group may be involved in platooning (or flocking). The platooning is a method (or feature) for driving a group of vehicles together while maintaining a close distance therebetween through a safe distance control. The plurality of vehicles in the group may exchange travelling (movement) and potential abnormal situation information through inter-vehicle communication, thereby maintaining a safe distance.

In some implementations, platooning may be achieved by a request of joining the platoon of the following vehicles and an approval of it by the lead vehicle. Approval is required because the lead vehicle shares its own vehicle driving information, which may be personal information, with the following vehicles.

In some implementations, the third path information may include authentication information required for interconnecting vehicles set as the group. The vehicles may quickly establish a group network by using authentication information included in the third path information prior to performing direct communication with each other.

When the platooning is employed, fuels of the vehicles in the group may be reduced. In addition, as the group of vehicles drive very closely together, a road occupancy rate by the vehicles is reduced, thereby mitigating congestion.

The platooning may be achieved through vehicle-to-object communication (V2X), or vehicle-to-vehicle communication (V2V). The group of vehicles in the platoon include the lead vehicle (or platoon leader) positioned at the forefront of the group and following vehicles (or platoon followers). One or more following vehicles receive driving information of the lead vehicle and move by following the lead vehicle.

The processor 130 may select any one vehicle as the lead vehicle based on the received path information.

As a plurality of vehicles may join a platoon by the communication device 100, a bottleneck in a predetermined range (area) may be minimized.

The present disclosure may be implemented as computer-readable codes (applications or software) in a program-recorded medium. The method of controlling the autonomous vehicle may be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A communication device, comprising:
 a communication unit configured to receive first path information from a first vehicle and to receive second path information from a second vehicle; and
 a processor configured to:
  determine a possibility of the first and second vehicles entering a predetermined area based on the first and second path information, and
  based on the possibility being greater than a reference, transmit, through the communication unit, a message for controlling at least one of the first vehicle or the second vehicle to allow the first and second vehicles to enter the predetermined area at different time points,
  based on the first and second path information, generate third path information for changing a route of at least one of the first vehicle or the second vehicle to allow the first and second vehicles to enter the predetermined area at the different time points, and
  transmit the third path information to one of the first vehicle or the second vehicle such that (i) the first vehicle changes the route of the first vehicle from the first path information to the third path information based on the first vehicle receiving the third path information, or (ii) the second vehicle changes the route of the second vehicle from the second path information to the third path information based on the second vehicle receiving the third path information.

2. The device of claim 1, wherein the processor is configured to control the communication unit to transmit at least a portion of the first path information to the second vehicle.

3. The device of claim 2, wherein the processor is configured to:
 determine a first portion of the first path information that satisfies a reference condition; and
 transmit, to the second vehicle, a second portion of the first path information that does not include the first portion of the first path information.

4. The device of claim 3, wherein the first portion of the first path information includes at least one of vehicle information corresponding to the first vehicle or personal information corresponding to a passenger in the first vehicle.

5. The device of claim 1, wherein the processor is configured to:
 select one of the first vehicle or the second vehicle based on the first and second path information; and
 transmit the message to the selected one of the first vehicle or the second vehicle.

6. The device of claim 5, wherein the processor is configured to:
 select one of the first vehicle or the second vehicle that travels at a speed slower than a speed of the other of the first vehicle or the second vehicle.

7. The device of claim 5, wherein the processor is configured to:
 select one of the first vehicle or the second vehicle that has a communications service quality greater than a communications service quality of the other of the first vehicle or the second vehicle.

8. The device of claim 1, wherein the processor is configured to:
 select one of the first vehicle or the second vehicle that is capable of at least one of accelerating, decelerating, or changing a traveling direction without driver intervention; and
 transmit the message to the selected one of the first vehicle or the second vehicle.

9. The device of claim 1, wherein the predetermined area includes a lane corresponding to an intersection of a plurality of lanes.

10. The device of claim 1, wherein the predetermined area includes a road without a centerline.

11. The device of claim 1, wherein the message includes a speed control command for changing a speed of the at least one of the first vehicle or the second vehicle.

12. The device of claim 1, wherein the first path information and the third path information include paths for the first vehicle that are different from each other, and
 wherein the second path information and the third path information include paths for the second vehicle that are different from each other.

13. A control method comprising:
 receiving first path information from a first vehicle;
 receiving second path information from a second vehicle;
 determining a possibility of the first and second vehicles entering a predetermined area based on the first and second path information; and
 based on the possibility being greater than a reference, transmitting a message for controlling at least one of the first vehicle or the second vehicle to allow the first and second vehicles to enter the predetermined area at different time points;

based on the first and second path information, generating third path information for changing a route of at least one of the first vehicle or the second vehicle to allow the first and second vehicles to enter the predetermined area at the different time points; and transmitting the third path information to one of the first vehicle or the second vehicle such that (i) the first vehicle changes the route of the first vehicle from the first path information to the third path information based on the first vehicle receiving the third path information, or (ii) the second vehicle changes the route of the second vehicle from the second path information to the third path information based on the second vehicle receiving the third path information.

14. The control method of claim 13, further comprising:

determining a first portion of the first path information that satisfies a reference condition; and transmitting, to the second vehicle, a second portion of the first path information that does not include the first portion of the first path information.

15. The control method of claim 14, wherein the first portion of the first path information includes at least one of vehicle information corresponding to the first vehicle or personal information corresponding to a passenger in the first vehicle.

16. The control method of claim 13, wherein transmitting the message comprises:

selecting one of the first vehicle or the second vehicle based on the first and second path information; and transmitting the message to the selected one of the first vehicle or the second vehicle.

17. The control method of claim 13, wherein the message includes a speed control command for changing a speed of the at least one of the first vehicle or the second vehicle.

18. The control method of claim 13, further comprising setting the predetermined area based on a map data, wherein the predetermined area includes at least one of a lane corresponding to an intersection of a plurality of lanes or a road without a centerline.

19. The control method of claim 13, wherein the first path information and the third path information include paths for the first vehicle that are different from each other, and wherein the second path information and the third path information include paths for the second vehicle that are different from each other.

* * * * *